(12) United States Patent
Siegel et al.

(10) Patent No.: US 11,040,694 B1
(45) Date of Patent: Jun. 22, 2021

(54) PORTABLE RESTRAINING PASSENGER SAFETY HARNESS

(71) Applicant: Ellen K. Siegel, Westport, CT (US)

(72) Inventors: Ellen K. Siegel, Westport, CT (US); Corey A. Campbell, Wadsworth, OH (US); David E. Campbell, Bolivar, OH (US)

(73) Assignee: Ellen K. Siegel, Westport, CT (US)

( * ) Notice: Subject to any disclaimer, the term of this patent is extended or adjusted under 35 U.S.C. 154(b) by 0 days.

(21) Appl. No.: 16/837,137

(22) Filed: Apr. 1, 2020

Related U.S. Application Data

(63) Continuation of application No. 16/205,407, filed on Nov. 30, 2018, now Pat. No. 10,640,078.

(51) Int. Cl.
B60R 22/10 (2006.01)
B60R 22/14 (2006.01)

(52) U.S. Cl.
CPC ............ *B60R 22/105* (2013.01); *B60R 22/14* (2013.01)

(58) Field of Classification Search
None
See application file for complete search history.

(56) References Cited

U.S. PATENT DOCUMENTS

| | | | | |
|---|---|---|---|---|
| 3,692,262 A * | 9/1972 | Gaylord | ................. | B64D 17/30 244/151 A |
| 3,954,280 A * | 5/1976 | Roberts | ................. | B60R 22/105 280/801.2 |
| 4,411,473 A * | 10/1983 | Ettridge | ................. | B60N 2/4249 297/216.11 |
| 4,674,664 A * | 6/1987 | Simon | ................. | A45F 3/04 224/153 |
| 5,544,363 A * | 8/1996 | McCue | ................. | A62B 35/04 2/102 |
| 5,806,740 A * | 9/1998 | Carlson | ................. | A45F 3/047 224/259 |
| 6,089,662 A * | 7/2000 | Lambert | ................. | B60R 22/105 297/238 |
| 6,138,277 A * | 10/2000 | Gillen | ................. | A41D 13/015 2/102 |
| 6,886,889 B2 * | 5/2005 | Vits | ................. | B60N 2/242 297/216.13 |
| 7,131,703 B1 * | 11/2006 | Sheridan | ................. | B60R 22/105 297/465 |
| 9,108,543 B1 * | 8/2015 | Knapp | ................. | B60N 2/2812 |
| 9,931,236 B2 * | 4/2018 | Williamson | ............ | A61F 5/026 |
| 9,933,233 B1 * | 4/2018 | Roccisano | ............ | F41C 33/041 |
| 10,034,533 B1 * | 7/2018 | Santana-Zaizar | ......... | A45F 3/10 |
| 10,391,898 B1 * | 8/2019 | Richards | ................. | B60N 2/688 |
| 10,850,142 B2 * | 12/2020 | Emonin | ............. | A62B 35/0018 |

(Continued)

FOREIGN PATENT DOCUMENTS

GB 1187677 A * 4/1970 ............ B64D 25/06

*Primary Examiner* — David E Allred
(74) *Attorney, Agent, or Firm* — Renner, Kenner, Bohak, Taylor & Weber

(57) ABSTRACT

A portable restraining passenger safety harness includes a harness body and a pair of shoulder straps. The harness body contains a left shoulder area and a right shoulder area, and the size of the safety harness can be adjusted by adjusting the height of the left and right shoulder areas. The harness is securable to a vehicle by a vehicle seat belt passing behind the child through a back panel located on a rear portion of the harness.

19 Claims, 11 Drawing Sheets

(56) References Cited

U.S. PATENT DOCUMENTS

| | | | |
|---|---|---|---|
| 2003/0168280 A1* | 9/2003 | Jones | A62B 35/0025 |
| | | | 182/3 |
| 2005/0179244 A1* | 8/2005 | Schroth | B60R 22/14 |
| | | | 280/808 |
| 2006/0071535 A1* | 4/2006 | Kim | B60R 22/105 |
| | | | 297/465 |
| 2009/0230741 A1* | 9/2009 | Aaron | B60R 22/14 |
| | | | 297/250.1 |
| 2010/0115685 A1* | 5/2010 | Hepler | B60R 22/14 |
| | | | 2/129 |
| 2010/0242233 A1* | 9/2010 | Wolner | A62B 35/0031 |
| | | | 24/197 |
| 2013/0055483 A1* | 3/2013 | Moreno | A41B 13/10 |
| | | | 2/49.1 |
| 2013/0221649 A1* | 8/2013 | Diez Marin | B60R 22/14 |
| | | | 280/808 |
| 2013/0249204 A1* | 9/2013 | Fink | B60R 22/024 |
| | | | 280/801.1 |
| 2013/0285424 A1* | 10/2013 | Gardner | A47D 13/025 |
| | | | 297/250.1 |
| 2014/0221893 A1* | 8/2014 | Modglin | A61F 5/026 |
| | | | 602/19 |
| 2014/0305437 A1* | 10/2014 | Zhu | A62B 25/00 |
| | | | 128/205.22 |
| 2015/0069812 A1* | 3/2015 | Kim | B60R 22/105 |
| | | | 297/465 |
| 2016/0143377 A1* | 5/2016 | Kuru | A41D 13/046 |
| | | | 2/48 |
| 2016/0278508 A1* | 9/2016 | Engdahl | A45F 3/047 |
| 2018/0022241 A1* | 1/2018 | Jewkes | B60N 2/2806 |
| | | | 297/253 |

* cited by examiner

PORTABLE RESTRAINING PASSENGER SAFETY HARNESS

CROSS-REFERENCE TO RELATED APPLICATIONS

The present application is a continuation application of U.S. patent application Ser. No. 16/205,407, filed on Nov. 30, 2018, the contents of which are incorporated herein by reference.

FIELD OF THE INVENTION

This invention relates to a portable restraining passenger safety harness. More particularly, this invention relates to a juvenile portable restraining passenger safety harness. Most particularly, this invention relates to a portable restraining passenger safety harness that is easily height adjustable and which contains only one unitary piece of webbing in the shoulder areas on each side of the harness which provides the harness with a stronger structure less prone to being torn or ripped.

BACKGROUND OF THE INVENTION

Vehicle crashes, specifically car crashes, remain one of the leading causes of death for children. When driving with children on board, it is safer to restrain their bodies in the seats of vehicles so as to protect them from potential injuries that may be caused by a road accident. Seatbelts with a lap belt or a combination of a lap and shoulder belt are currently used with seats in moving vehicles such as cars, trains and airplanes, to secure and restrain each passenger in one of the seats. Although cars are generally equipped with seat belts providing considerable safety for passengers, these seat belts are designed for adult wearers of limited size and weight ranges. Seatbelts are designed for adults, and not for children, resulting in an improper fit when used with children.

The level of protection offered by these conventional seat belts may not be sufficient for children whose body sizes are generally smaller as compared with adults. With the current trend of decreasing vehicle ownership and increasing use of ridesharing services, there is a need for a child restraint that is highly portable and easy to use. Current commercially available child restraints for use in a moving vehicle are bulky, difficult to transport and install between vehicles, and frequently used incorrectly.

There is a need for a child restraint that is used with seatbelts that is sized based on a wearer's age and a wide range of the wearer's size and which furthermore secures the wearer to seats in moving vehicles. There is also a need for a child restraint that secures the wearer to seats in moving vehicles even if the provided seatbelt is not sized to fit the wearer by routing the vehicle belt behind the occupant to secure the harness to the vehicle. There is a further need for a child restraint that utilizes pre-existing seatbelts and that is modular and thus can be used with any of the varied designs of seatbelts in virtually all moving vehicles. There is still a further need for a child restraint that is a harness having two mechanisms that connects the harness to a wearer, so that after the first, more easily secured mechanism, is connected it maintains the position of the harness on the wearer until the second mechanism is connected. Finally, there is an additional need in the art to provide a child restraint that is structurally strong such that it is not prone to tears or rips if the child restraint is subject to forces resulting from an accident, impact or a sudden stop.

SUMMARY OF THE INVENTION

It is thus an object of one aspect of the present invention to provide a portable restraining passenger safety harness.

It is an object of another aspect of the present invention to provide a portable restraining passenger safety harness as above, that is easily height adjustable.

It is an object of yet another aspect of the present invention to provide a portable restraining passenger safety harness as above, that includes a pair of shoulder straps wherein each shoulder strap of the pair of shoulder straps is defined by a unitary piece of material.

These and other objects of the present invention, as well as the advantages thereof over existing prior art forms, which will become apparent from the description to follow, are accomplished by the improvements hereinafter described and claimed.

In general, a portable restraining passenger safety harness includes a harness body and a pair of shoulder straps. The harness body contains a left shoulder area and a right shoulder area, and the size of the safety harness can be adjusted by adjusting the height of the left and right shoulder areas.

A preferred exemplary portable restraining passenger safety harness according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF ILLUSTRATIVE EMBODIMENTS

Figure 1:
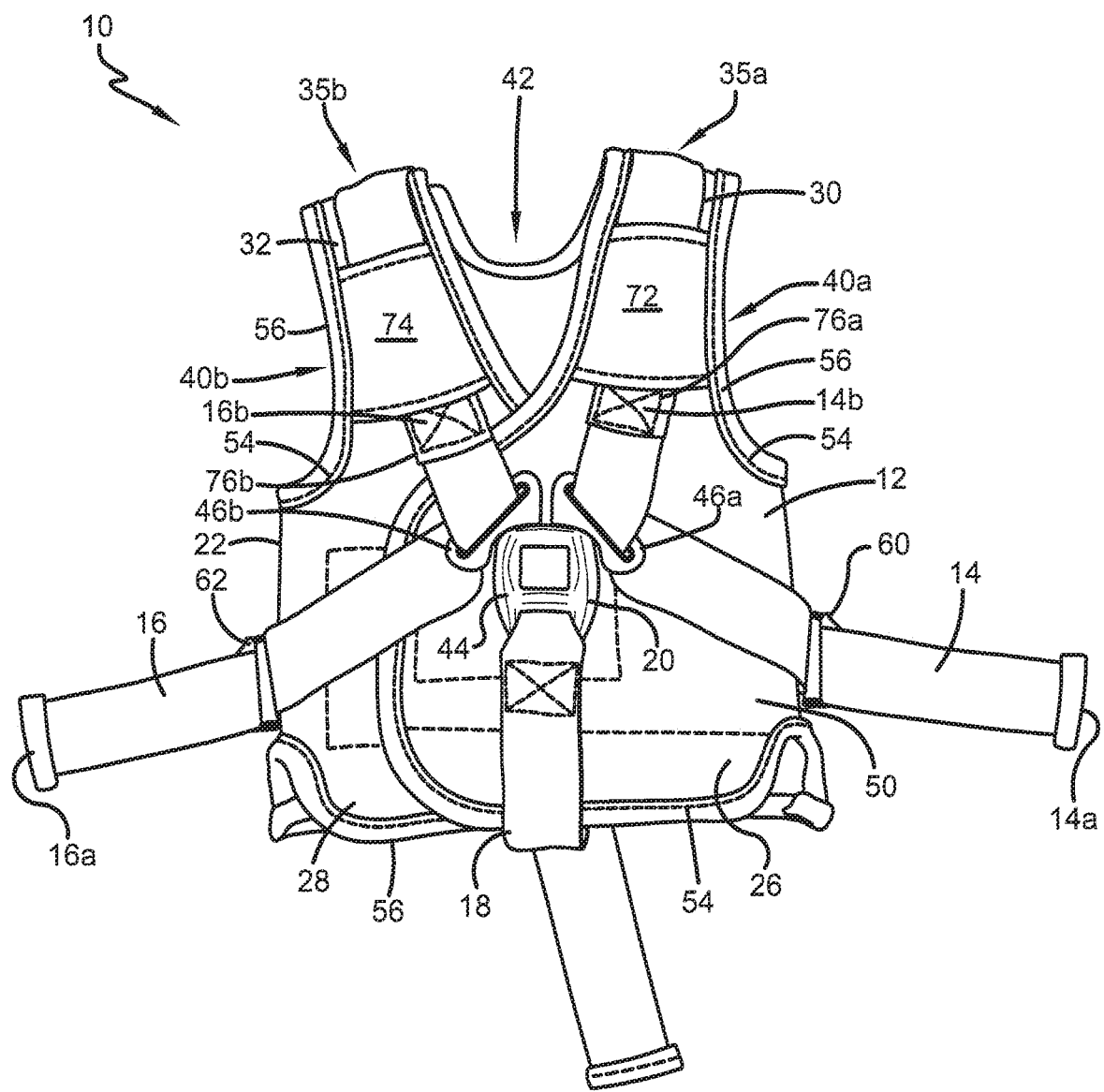
FIG. 1 is a front elevational view of an exemplary embodiment of a harness of the present invention wherein the buckle of the harness is shown in a buckled position.

A portable restraining passenger safety harness made in accordance with the present invention is generally indicated by the numeral 10. Harness 10 comprises a harness body 12, a left shoulder strap 14, a right shoulder strap 16, crotch strap 18, back strap 19 and a securement means 20. Harness body 12 is defined by a front portion 22 and a rear portion 24. Front portion 22 of harness body 12 is defined by a left chest portion 26, a right chest portion 28, a left front shoulder portion 30 and a right front shoulder portion 32. As shown clearly in FIG. 6, rear portion 24 of harness body 12 is defined by a left rear shoulder portion 34, a right rear shoulder portion 36, and a back portion 38. Furthermore, FIG. 6 also shows the location of back strap 19 on harness 10. Harness body 12 has a pair of arm holes 40a and 40b and a head hole 42 such that harness body 12 will cover a portion of a wearer's chest, shoulders and torso when harness 10 is positioned on a wearers body.

In some embodiments of the present invention, it is contemplated that left shoulder strap 14, right shoulder strap 16, crotch strap 18, and back strap 19 are made from a material selected from the group consisting of flat nylon, polyester, or other webbing and combinations thereof.

Figure 2:
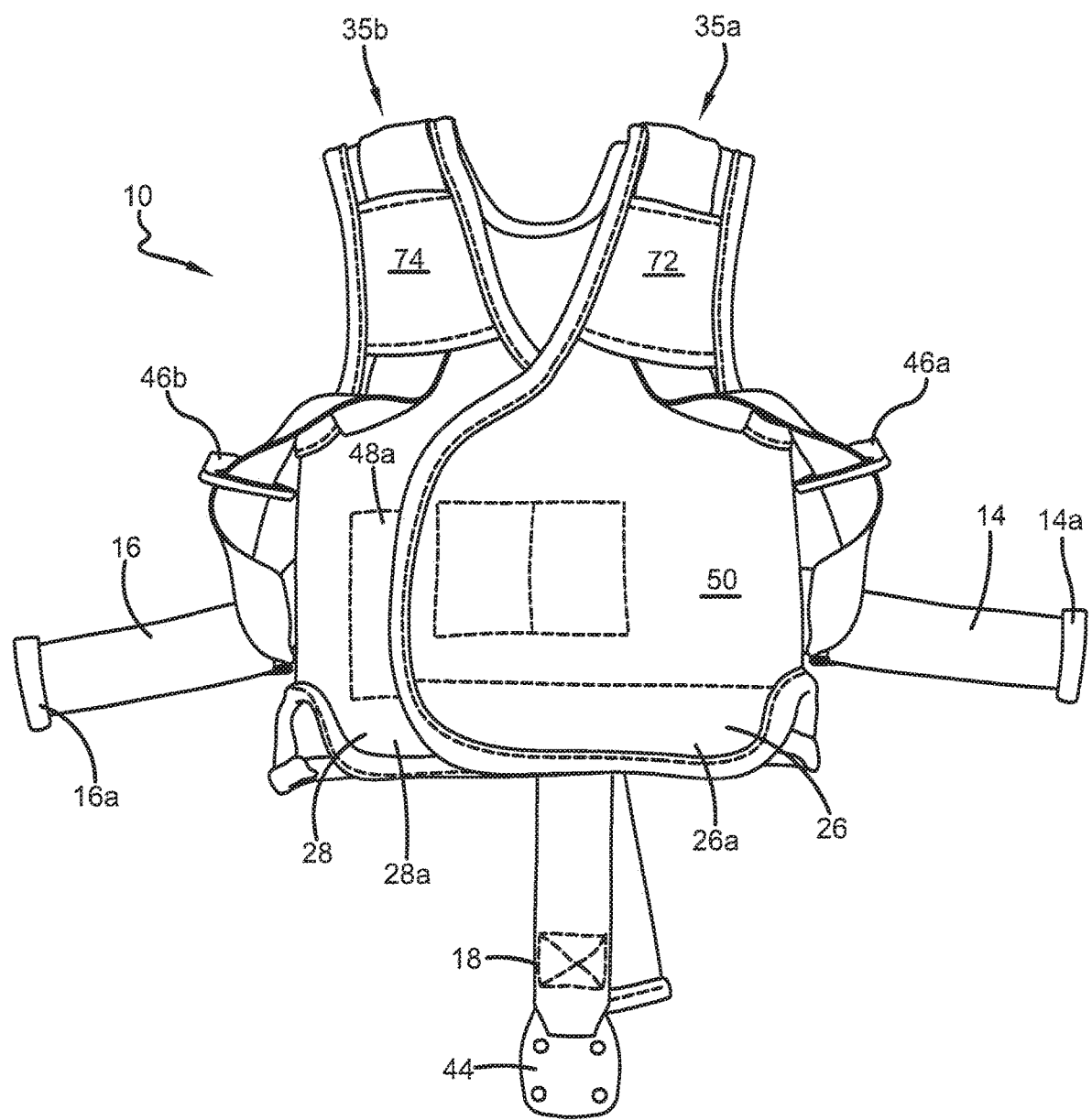
FIG. 2 a front elevational view of harness of FIG. 1 wherein the buckle is shown in an un-buckled position.
Figure 3:
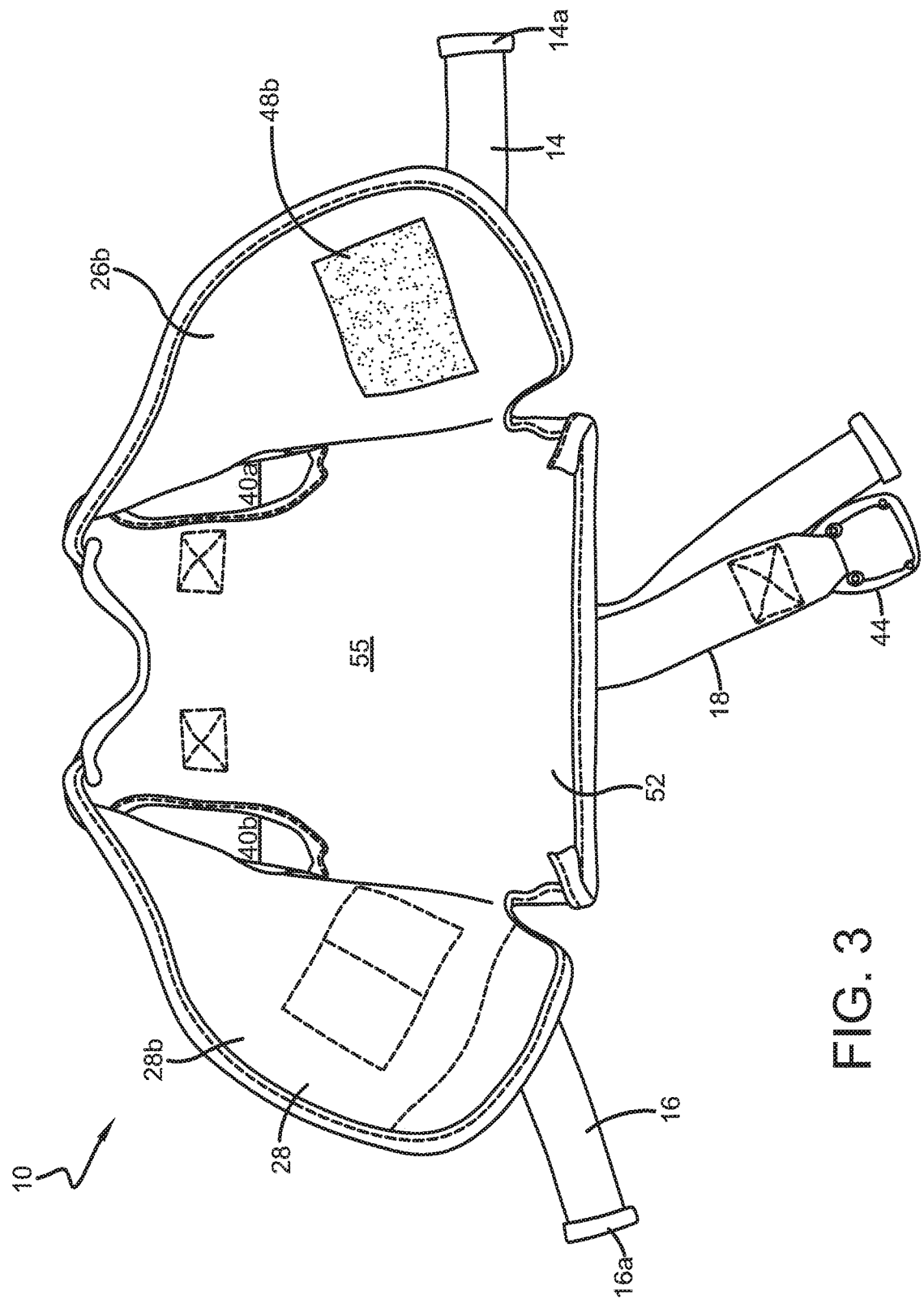
FIG. 3 is an elevated view of an inside portion of the harness of FIG. 1.

In some embodiments of the present invention, securement means 20 is a traditional 5 point harness buckle. As shown in FIGS. 1 and 2, securement means 20 includes a female securement means 44 and two male securement means 46a and 46b. As shown in FIGS. 1 and 2, female securement means 44 is attached to crotch strap 18, male securement means 46a is slideably located on left shoulder strap 14, and male securement means 46b is slideably located on right shoulder strap 16. In some embodiments of the present invention, in addition to securement means 20 connecting harness 10 to a wearer, harness 10 also utilizes a hook and loop fastener 48a and 48b as an additional mechanism to connect harness 10 to a wearer. As shown in FIGS. 2 and 3, left chest portion 26 is defined by an outer surface 26a and an inner surface 26b and right chest portion 28 is defined by an outer surface 28a and an inner surface 28b. In some embodiments of the present invention, such as shown in FIGS. 2 and 3, hook fastener 48a is located on outer surface 28a of the right chest portion 28 and loop fastener 48b is located on inner surface 26b of the left chest portion 26. Accordingly, hook and loop fastener 48a and 48b provide a second and independent structure to that of securement means 20 to maintain harness body 12 in a closed position.

Harness body 12 comprises an outer material 50 and an inner material 52. In one embodiment of the present invention, the material of outer material 50 is the same material used for inner material 52. In other embodiments, a material of outer material 50 is a different material than the material used for inner material 52. In some embodiments of the present invention, the material used for outer material 50 is selected from the group consisting of 100 percent ballistic nylon, polyester, cotton, blends and any other type of fabric or sheet material. In some embodiments of the present invention, the material used for inner material 52 is selected from the group consisting of 3D mesh fabric or other breathable material. In some embodiments of the present invention, it is contemplated that outer material 50, inner material 52, and all other materials may be treated with a fire retardant.

As shown in the drawings, in some embodiments of the present invention, outer material 50 is secured to inner material 52 with the use of an attachments means 54 located around the exterior of harness body 12. In some embodiments of the present invention, attachment means 54 are selected from the group consisting of stitches, staples, adhesive, welding, snaps, or fabric hook and loop fasteners and a combination thereof. In some embodiments, outer material 50 is secured to inner material 52 using attachment means 54 and an edge material 56. Edge material 56 is placed along the outside of the edges of the outer material 50 and inner material 52. Once in place, attachment means 54 is used to secure edge material 56 to both the outer material 50 and inner material 52 such as to secure outer material 50 and inner material 52 in position so as to define harness body 12. If used, edge material 56 is selected from the group consisting of 100 percent nylon, polyester, cotton, blends and any other type of fabric or sheet material. In some embodiments of the present invention, it is contemplated that edge material 56 is treated with a fire retardant.

During construction of harness 10, a die-cut relatively flat piece of plastic (not shown) is placed between inner back portion 55 and back portion 38 of harness 10. This piece of plastic provides harness 10 with body such that it maintains the shape of harness 10 making it easier to put on a wearer.

Figure 4:
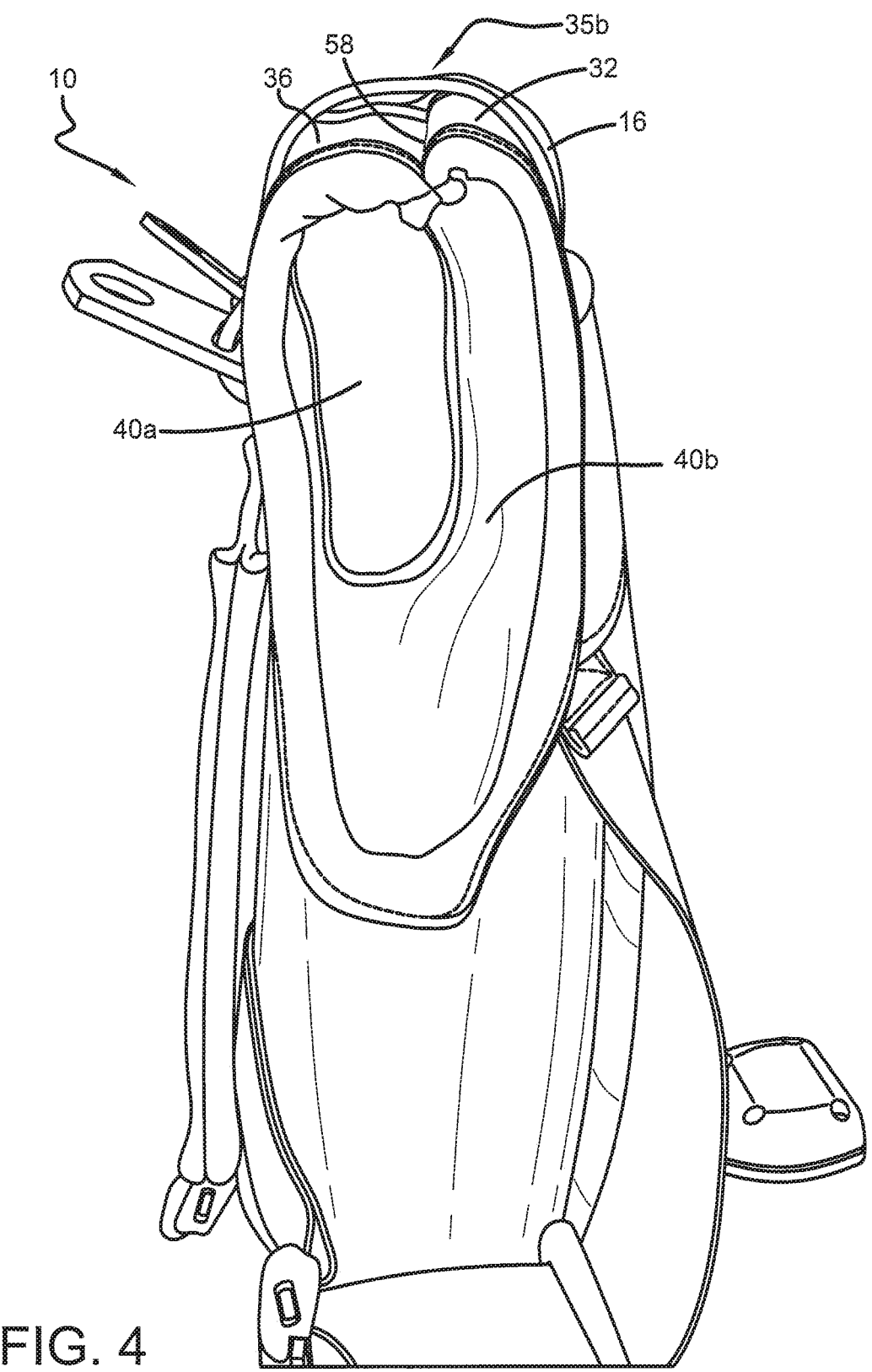
FIG. 4 is a side perspective view of the harness of FIG. 1 wherein the shoulder portion of the harness is shown in its highest position.

As is evident in the drawings of the present invention, front portion 22 and rear portion 24 of harness body 12 are secured to each other in the area of the right front shoulder portion 32 and the right rear shoulder portion 36, and in the area of the left front shoulder portion 30 and the left rear shoulder portion 34. Specifically, the front portion 22 and rear portion 24 are secured to each other at a left stitch line 57 and a right stitch line 58. The right stitch line 58 is particularly evident in FIGS. 4 and 5 of the present invention. Specifically, the left stitch line 57 secures the left front shoulder portion 30 to the left rear shoulder portion 34, and the right stitch line 58 secures the right front shoulder portion 32 to the right rear shoulder portion 36. As will be discussed in more detail below, stitch lines 57 and 58 form natural folding points which will assist in adjusting the height of harness 10 so as to accommodate wearers of various heights and sizes.

Figure 6:
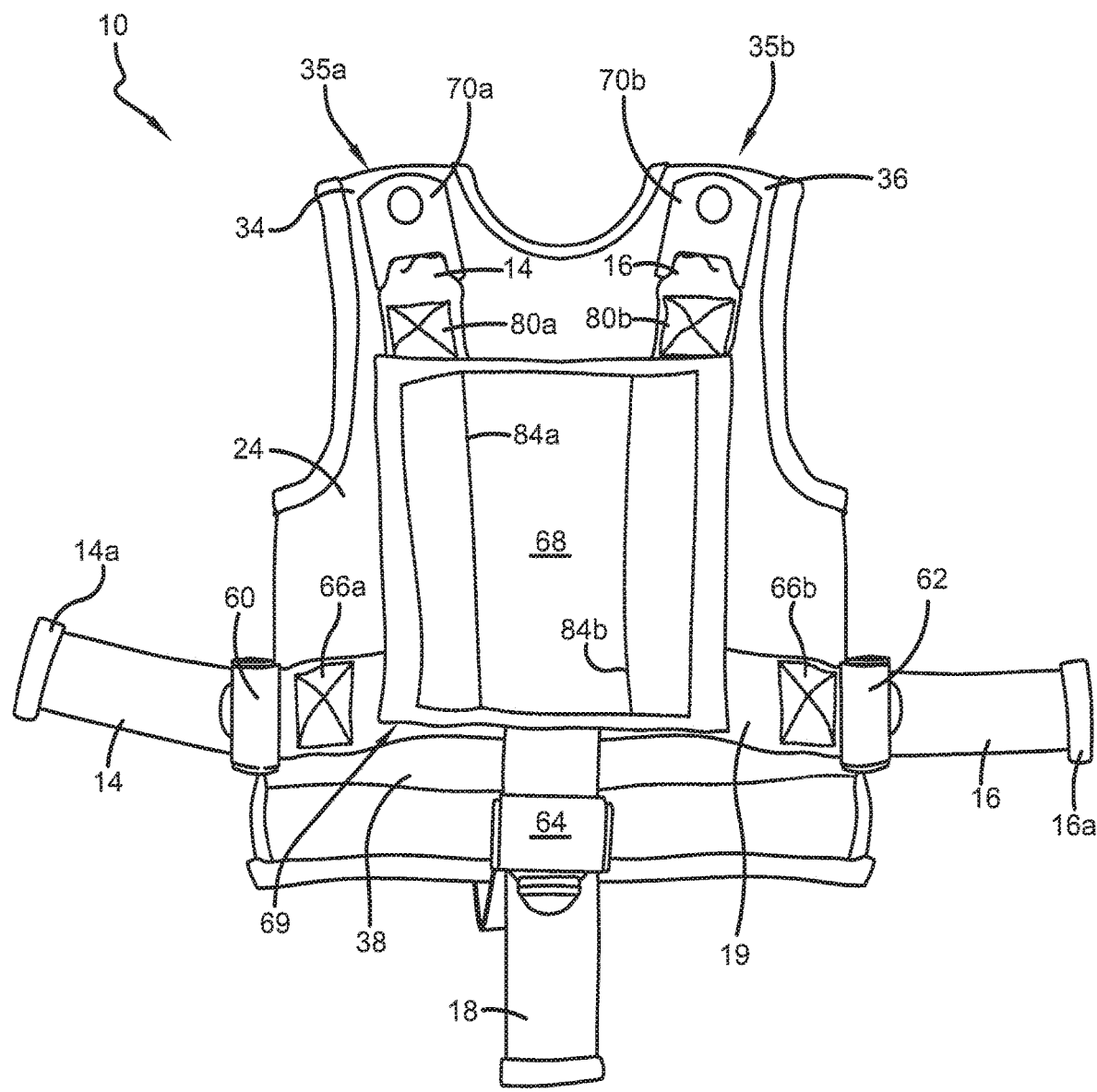
FIG. 6 is an elevational view of the back of harness of FIG. 1.

Rear portion 24 of harness body 12 is shown in FIG. 6. Also shown in FIG. 6 are a left strap adjustment means 60, a right strap adjustment means 62, and a crotch strap adjustment means 64. In one embodiment of the present invention, the strap adjustment means 60, 62 and 64 are traditional tilt lock adjusters. In other embodiments, adjustment means 60, 62 and 64 are push button adjustors. Left strap adjustment means 60 is utilized so as to adjust the length of left shoulder strap 14, right strap adjustment means 62 is utilized so as to adjust the length of right shoulder strap 16, and crotch strap adjustment means 64 is utilized so as to adjust the length of crotch strap 18.

Located on rear portion 24 is also back strap 19. Back strap 19 is secured to back portion 38 at securement zones 66a and 66b. In some embodiments of the present invention, back strap 19 is secured to back portion 38 at securement zones 66a and 66b utilizing an attachment means selected from the group consisting of stitches, staples, adhesive, welding, snaps, or fabric hook and loop fasteners, and a combination thereof. Additionally, a first end of back strap 19 is drawn through and secured to the left strap adjustment means 60 so as to connect back strap 19 with left shoulder strap 14 and a second end of back strap 19 is drawn through and secured to the right adjustment means 62 so as to connect back strap 19 with right shoulder strap 16. With this relationship between back strap 19, the left strap adjustment means 60, the left shoulder strap 14, the right strap adjustment means 62, and the right shoulder strap 16, the back strap 19 creates an enclosure around the child so as to secure harness 10 around the wearer of the harness.

Figure 8:
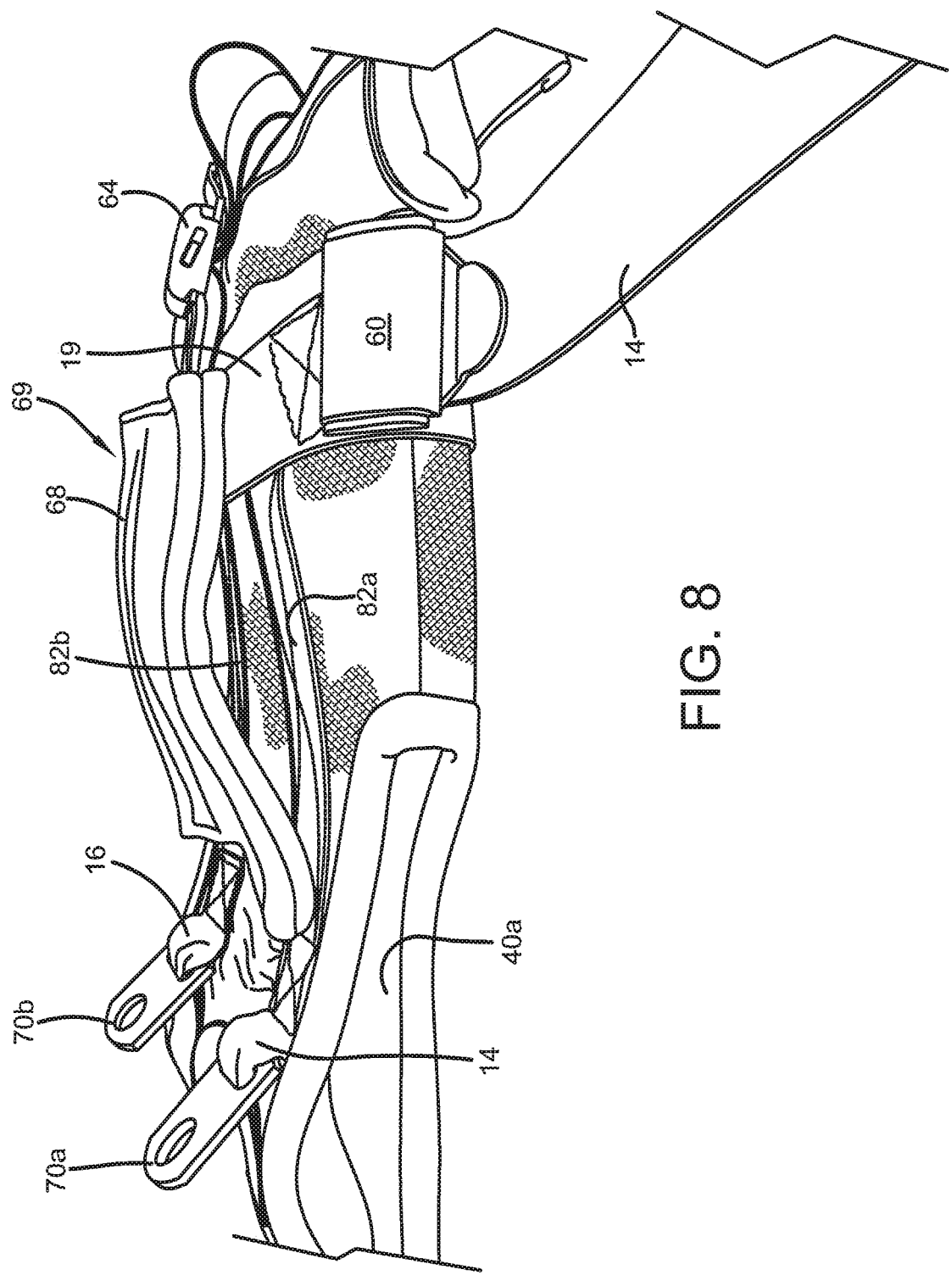
FIG. 8 is a side perspective view of the back of the harness of FIG. 1 wherein the vehicle belt pocket is in a raised position.

Also located on rear portion 24 of harness body 12 is back panel 68. As shown in FIG. 8, back panel 68 can be lifted up and away from the rear portion 24 of harness body 12. Back panel 68 is designed in this manner because this allows for the routing of a seat belt of a vehicle (not shown) through the area between back panel 68 and back portion 38, and the seat belt is then secured to a vehicle seat belt buckle (not shown). The seat belt is positioned between back panel 68 and back portion 38 while a wearer of harness 10 is seated in the vehicle, so that the seat belt when secured in the vehicle is behind the back of the wearer. This arrangement provides for positioning the vehicle seat belt behind the wearer, eliminating the possibility of possible physical injury such as injury to the wearer's internal organs, which can occur from the use of a seat belt with a child occupant whom the seat belt does not properly fit in the event of a vehicle collision or abrupt stop.

Once the vehicle seat belt is routed through this area and secured, the harness 10 will be secured in place within the vehicle. Back panel 68 also incases a portion of both the left shoulder strap 14 and the right shoulder strap 16. The specific routing of the left and right shoulder straps 14 and 16 will be discussed in more detail below. However, due to the back panel 68 encasing a portion of both the left and right shoulder straps 14 and 16, this allows for assurance that the vehicle lap belt is routed through loops created by both the left and right shoulder straps 14 and 16 when the vehicle lap belt is routed through the area between back panel 68 and back portion 38. The routing of the vehicle seat belt in the manner described above will assure that the vehicle seat belt will be coupled with the left and right shoulder straps 14 and 16 which eliminates a potential misuse of the harness that would result in a reduction of protection for the wearer in in the event of a vehicle collision or abrupt stop.

Figure 10:
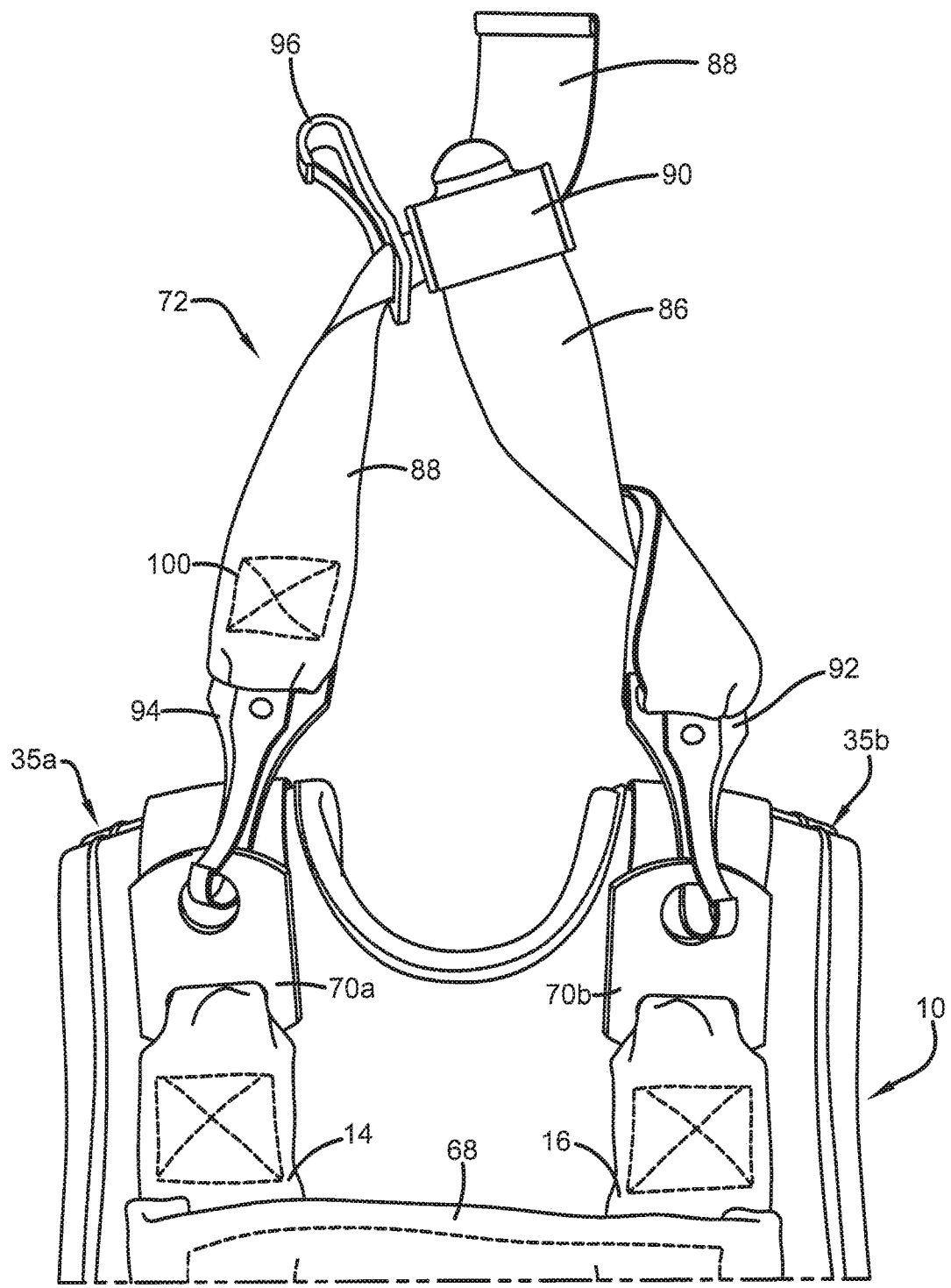
FIG. 10 is an elevational view of the back of the harness of FIG. 1 showing a top tether attachment device attached to the anchor point attachments means.
Figure 11:
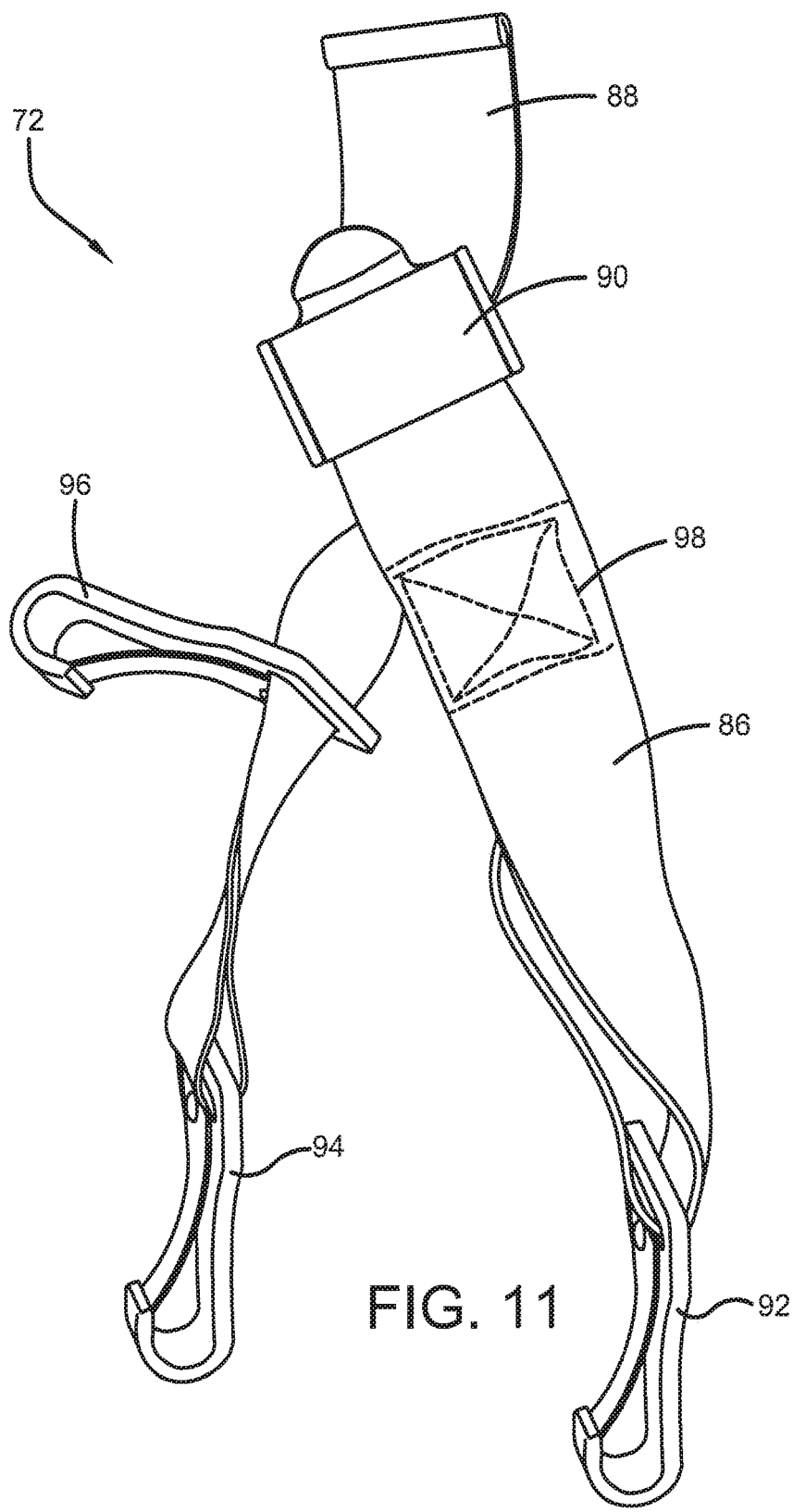
FIG. 11 is a perspective view of a top tether attachment device.

An additional feature of harness 10 that is located on rear portion 24 of harness body 12 are anchor point attachment means 70a and 70b. Anchor point attachment means 70a and 70b can be utilized with a top tether attachment device 72 (as shown in FIGS. 10 and 11) to secure the harness 10 to top tether anchorage points located in different positions in vehicles (usually behind the rear seat of a vehicle). Attaching harness 10 to a top tether anchorage point(s) in a vehicle is not required by law which is why not all vehicle seats are equipped with this system. However, attaching harness 10 to a top tether anchorage point(s) in a vehicle reduces the forward and sideways displacement of harness 10 and the wearer during a crash, offering additional safety. The way in which anchor point attachment means 70a and 70b are secured to harness 10 will be discussed below in more detail.

An important aspect of the present invention is that both the left shoulder strap 14 and the right shoulder strap 16 are each respectively defined by a single piece of material. This is an important aspect of the present invention because using multiple pieces of material, such as nylon webbing, to define each of the left and right shoulder straps 14, respectively, would require each piece of webbing to be attached together. Each point of attachment between a two pieces of webbing means one more point of attachment that could rip or tear when force was applied. Therefore, because there is only a single, continuous piece of material for each of the left and right shoulder straps 14 and 16, harness 10 is stronger.

The specific routing of the left and right shoulder straps 14 and 16 will now be discussed. Beginning at a first end 14a of left shoulder strap 14, left shoulder strap 14 is routed through left strap adjustment means 60, across left chest portion 26, through male securement means 46a, under left strap guide 72, over left front shoulder portion 30, down left rear shoulder portion 34, through anchor point attachment 70a, and down back portion 38. Once down back portion 38 to a position adjacent the bottom 69 of the back panel 68, left shoulder strap 14 then loops around back strap 19 and back up back portion 38, traveling through back panel 68 such that a portion of left shoulder strap 14 is encased within the back panel 68. Once through back panel 68, left shoulder strap 14 again goes through anchor point attachment 70a, over left rear shoulder portion 34, down left front shoulder portion 30, and finally under the left strap guide 72 wherein a second end 14b of left shoulder strap 14 is secured to itself at a securement zone 76a.

As for right strap 16, beginning at a first end 16a, right shoulder strap 16 is routed through right strap adjustment means 62, across right chest portion 28, through male securement means 46b, under right strap guide 74, over right front shoulder portion 32, down right rear shoulder portion 36, through anchor point attachment 70b, and down back portion 38. Once down back portion 38 to a position adjacent the bottom 69 of the back panel 68, right shoulder strap 16 then loops around back strap 19 and back up back portion 38, traveling through back panel 68 such that a portion of right shoulder strap 16 is encased within the back panel 68. Once through back panel 68, right shoulder strap 16 goes through anchor point attachment 70b over right rear shoulder portion 36, down right front shoulder portion 32, and finally under the right strap guide 74 wherein a second end 16b of right shoulder strap 16 is secured to itself at a securement zone 76b.

Figure 9:
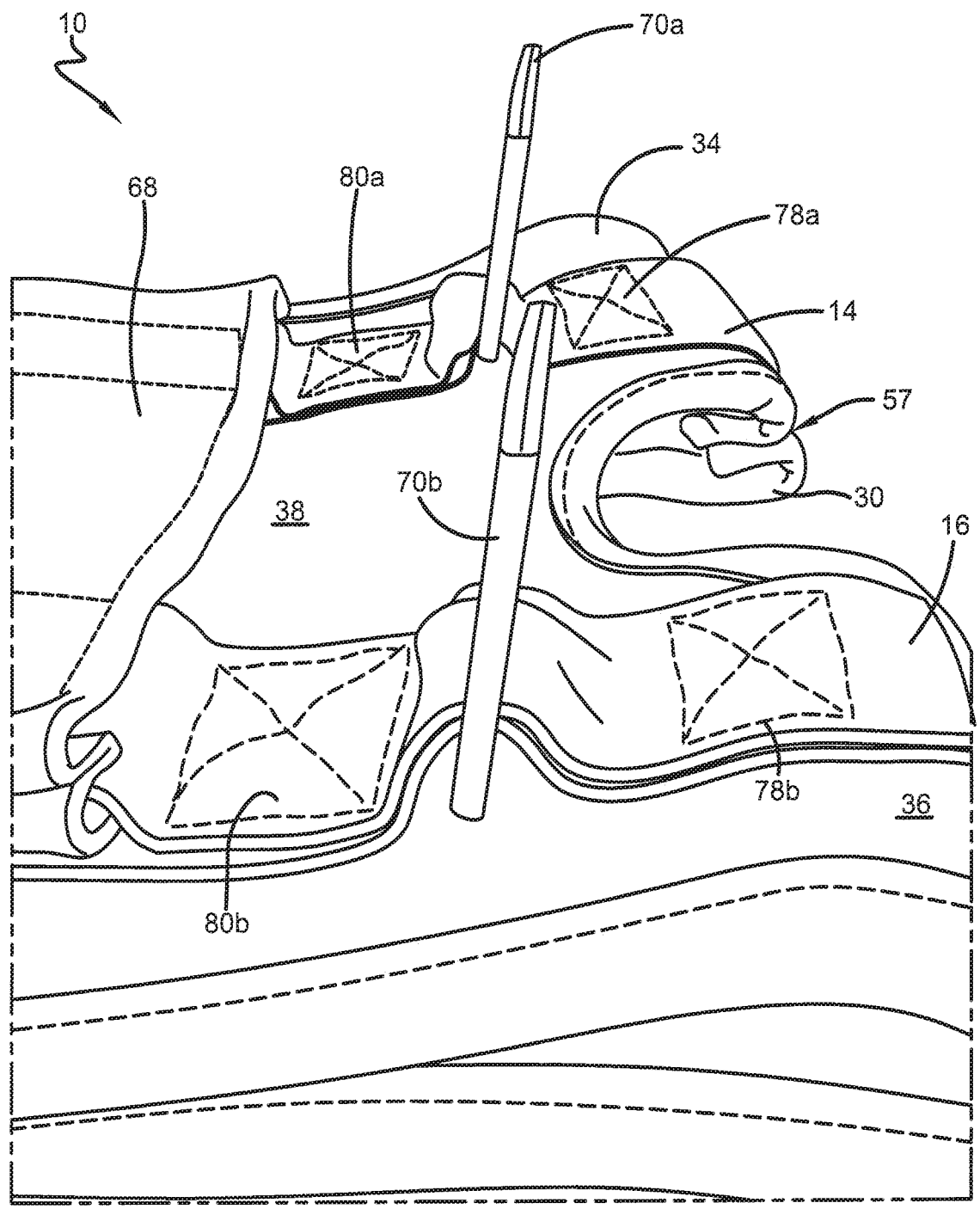
FIG. 9 is a side perspective view of the back of the harness of FIG. 1 focusing on the position of the anchor point attachment means on the back of the harness.

As shown in FIG. 9, the left and right shoulder straps 14 and 16 are additionally secured to harness 10 at securement zones 78a and 78b, and securement zones 80a and 80b, respectively. Securement zones 78a and 78b are located on left rear shoulder portion 34 and right rear shoulder portion 36, respectively. Securement zones 80a and 80b are in a position adjacent back panel 68. At the location of securement zones 78a and 78b, and securement zones 80a and 80b, the left and right shoulder straps 14 and 16 are secured directly to harness 10. Additionally, the securement means utilized at zones 78a, 78b, 80a, and 80b are also respectively securing overlapping portions of the left and right shoulder straps 14 and 16 to itself, as shown in FIG. 9. The securement means utilized at securement zones 78a and 78b, and securement zones 80a and 80b are selected from the group consisting of stitches, staples, adhesive, welding, snaps, or fabric hook and loop fasteners, and a combination thereof.

Anchor point attachment means 70a and 70b are also shown in FIG. 9. The location of anchor point attachment means 70a, between securement zones 78a and 80a, and the location of anchor point attachment means 70b, between securement zones 78b and 80b is an important aspect of the present invention because as can be seen in FIG. 9, two portions of left shoulder strap 14 run through the anchor attachment means 70a and two portions of right shoulder strap 16 run through the anchor attachment means 70b. The two portions of left shoulder strap 14 and right shoulder strap 16 run through anchor attachment means 70a and 70b, respectively, without any added cuts or sewing between the portions of the straps 14 and 16 as opposed to the straps 14 and 16 being looped through the anchor attachment means 70a and 70b, respectively, and then being sewed together. This arrangement, which as stated is made without any added cuts or sewing, allows for a stronger harness 10 because every time a strap, such as strap 14 or 16, is cut and sewn back together, there is a reduction in strength.

As discussed above, both the left and right shoulder straps 14 and 16 are routed down back portion 38 of harness body 12 prior to looping back up back portion 38, traveling through back panel 68 such that a portion of both the left and right shoulder straps 14 and 16 are encased within the back panel 68. As shown in FIG. 8, as the left and right straps 14 and 16 are routed down back portion 38, the left and right shoulder straps 14 and 16 are secured to back portion 38 utilizing securement means 82a and 82b, respectively. In one or more embodiments of the present invention, securement means 82a and 82b are selected from the group consisting of stitches, staples, adhesive, welding, snaps, or fabric hook and loop fasteners, and a combination thereof.

As shown in, for example, FIG. 6, the portions of left and right shoulder straps 14 and 16 that are encased within back panel 68 are secured within back panel 68 through the use of securement means 84a and 84b, respectively. In one or more embodiments of the present invention, securement means 84a and 84b are selected from the group consisting of stitches, staples, adhesive, welding, snaps, or fabric hook and loop fasteners, and a combination thereof.

Figure 7:
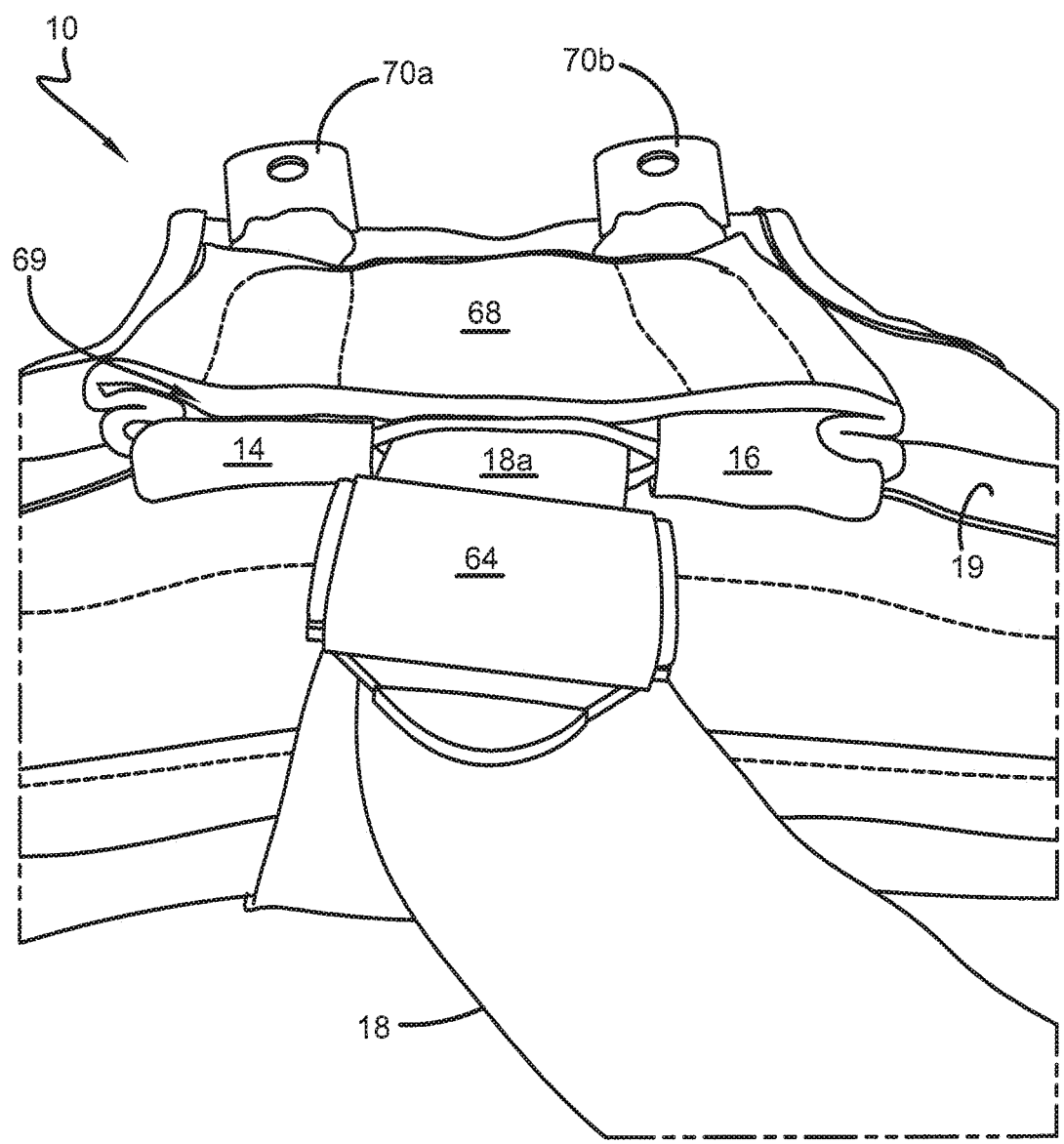
FIG. 7 is a perspective view of the back of the harness of FIG. 1 focusing on the position of the back strap.

FIG. 7 shows the relationship between left shoulder strap 14, right shoulder strap 16, crotch strap stationary portion 18a, and back strap 19. Back strap 19 is positioned such that back strap 19 is located between a portion of each of the left shoulder strap 14 and right shoulder strap 16, and the back panel 68. As stated above, left shoulder strap 14 and right shoulder strap 16 loop up back portion 38, and it is the act of the left and right shoulder straps 14 and 16 looping up that allows for back strap 19 to be positioned between a portion of each of the left shoulder strap 14 and right shoulder strap 16, and the back panel 68. Additionally, crotch strap stationary portion 18a loops around a portion of back strap 19, specifically, the portion of back strap 19 that lies between left shoulder strap 14 and right shoulder strap 16, as shown in FIG. 7. Once looped around back strap 19, the crotch strap stationary portion 18a is secured to back strap 19 at a position on back strap 19 between securement zones 66a and 66b. In one or more embodiments of the present invention, the securement means utilized to secure crotch strap stationary portion 18a to back strap 19 is selected from the group consisting of stitches, staples, adhesive, welding, snaps, or fabric hook and loop fasteners, and a combination thereof.

FIG. 10 shows top tether attachment device 72 secured to anchor point attachment means 70a and 70b of harness 10 and FIG. 11 shows top tether attachment device 72. Top tether attachment device comprises a fixed strap 86, an adjustable strap 88, a strap adjustment means 90, a first fixed hook 92, a second fixed hook 94, and an adjustable hook 96. In one or more embodiments of the present invention, strap adjustment means 90 is a traditional tilt lock adjuster. In other embodiments, strap adjustment means 90 is a push button adjuster. Strap adjustment means 90 is utilized so as to adjust the length of adjustable strap 88.

In some embodiments of the present invention, it is contemplated that fixed strap 86 and adjustable strap 88 are made from a material selected from the group consisting of flat polyester, nylon, or other webbing, and combinations thereof.

Fixed strap 86 is routed through strap adjustment means 90, but the length of fixed strap 86 is not adjustable by strap adjustment means. The ends of fixed strap 86 are secured together at securement zone 98 and first fixed hook 92 is located on fixed strap 86. Adjustable strap 88 is routed through strap adjustment means 90, and as stated above, the length of adjustable strap 88 is adjusted by utilizing strap adjustment means 90. An end of adjustable strap 88 is secured to a portion of adjustable strap 88 at securement zone 100, second fixed hook 94 is located on adjustable strap 88, and adjustable hook 96 is located on adjustable strap. The position of adjustable hook 96 is adjustable because adjustable hook 96 is slidable along the length of adjustable strap 88 between the position of the strap adjustment means 90 and the position of the second fixed hook 94. Adjustable hook 96 is utilized so as to secure the top tether attachment device 72 to top tether anchorage points located in different positions in vehicles; and the first and second fixed hooks 92 and 94 are utilized so as to secure the top tether attachment device 72 to anchor point attachment means 70a and 70b of harness 10.

Figure 5:
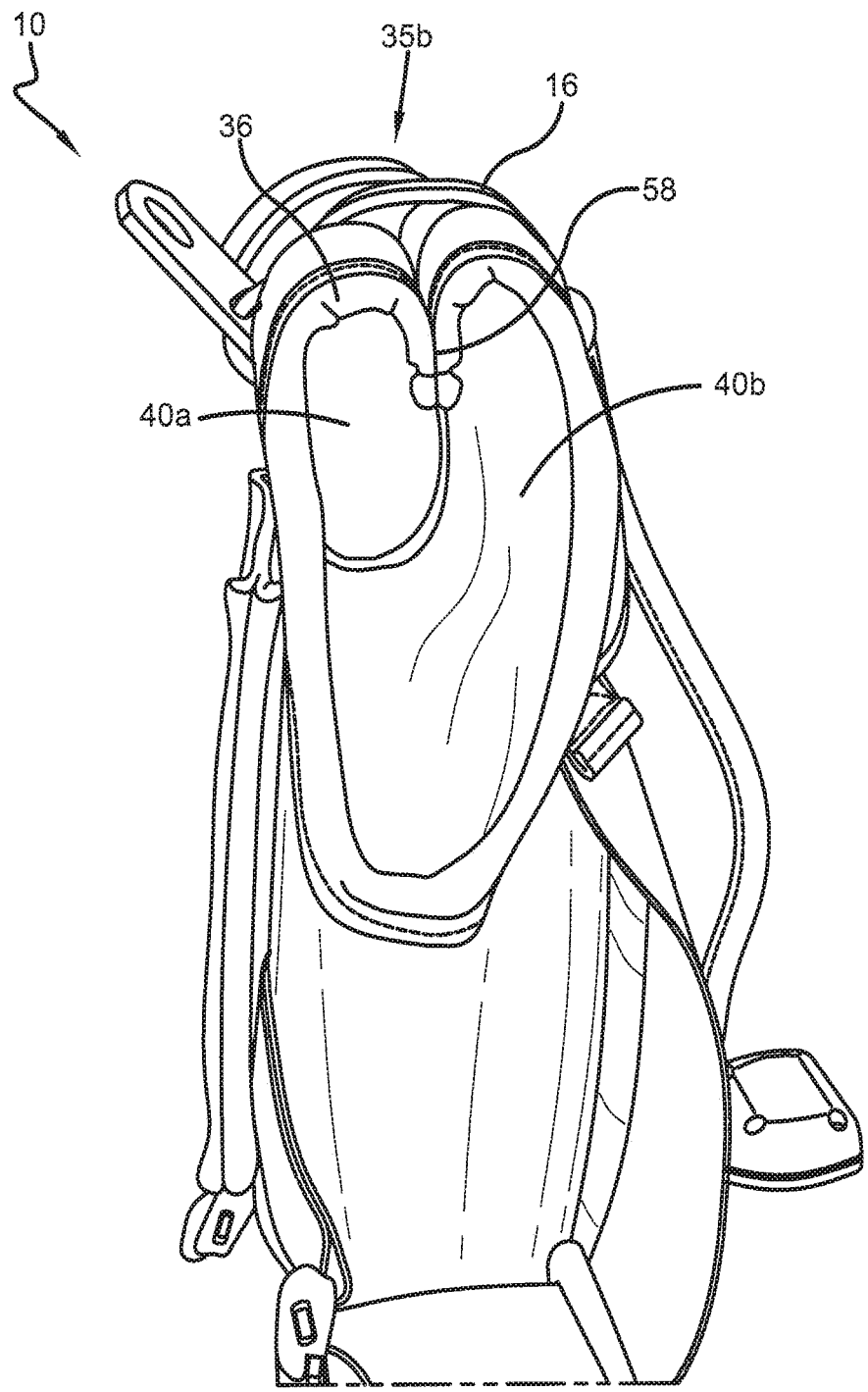
FIG. 5 is a side perspective view of the harness of FIG. 1 wherein the shoulder portion of the harness is shown in a lowered position.

An additional important aspect of the present invention is the ability to adjust the height of harness 10 so as to accommodate wearers of various heights and sizes. The area at which the left front shoulder portion 30 and the left rear shoulder portion 34 are secured together by left stich line 57 and the area at which the right front shoulder portion 32 and the right rear shoulder portion 36 are secured together by right stich line 58 can each be referred to as the shoulder areas 35a and 35b, respectively. The height of harness 10 is adjusted by taking the shoulder areas 35a and 35b and folding them down along stich lines 57 and 58, respectively, such as shown in FIG. 5. Once shoulder areas 35a and 35b are in a folded down position, the length of both the left and right shoulder straps 14 and 16 should be adjusted down so as to keep the shoulder areas 35a and 35b in their folded down positions. The adjustment of the lengths of both the left and right shoulder straps 14 and 16 can be made through the use of the left strap adjustment means 60 and the right strap adjustment means 62, respectively. The height adjustment of the harness 10 should ideally be done when harness 10 is positioned on a wearers body.

It should be recognized that the terms "first", "second", "left", "right", and the like may be used herein to modify various elements. These modifiers do not imply a spatial, sequential, or hierarchical order to the modified elements unless specifically stated.

In light of the foregoing, it should be appreciated that the present invention significantly advances the art by providing a portable restraining passenger safety harness that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A portable restraining passenger safety harness comprising:
   a. a harness body defining a waist size and a height size of the safety harness; and
   b. a pair of shoulder straps comprising a left shoulder strap and a right shoulder strap;
   c. a pair of shoulder strap adjustment means comprising a left shoulder strap adjustment means and a right shoulder strap adjustment means;
   wherein the harness body contains a left shoulder area and a right shoulder area, and wherein both the waist size and the height size of the safety harness can be adjusted simultaneously by adjusting the length of the left and right shoulder straps by means of the left and right shoulder strap adjustment means, which causes the left and right shoulder areas of the harness body to fold up or down to increase or decrease the height size of the harness body and the waist size of the harness body to increase or decrease.

2. The portable restraining passenger safety harness of claim 1, wherein each shoulder strap of the pair of shoulder straps is defined by a unitary piece of material.

3. The portable restraining passenger safety harness of claim 1, wherein the harness body is defined by a front portion and a rear portion.

4. The portable restraining passenger safety harness of claim 3, wherein the front portion is defined by a left chest portion, a right chest portion, a left front shoulder portion and a right front shoulder portion; and wherein the rear portion is defined by a back portion, a left rear shoulder portion and a right rear shoulder portion.

5. The portable restraining passenger safety harness of claim 4, wherein the left front shoulder portion and the left rear shoulder portion are secured together at a left stitch line to define the left shoulder area and wherein the right front shoulder portion and the right rear shoulder portion are secured together at a right stitch line to define the right shoulder area.

6. The portable restraining passenger safety harness of claim 3, further comprising a back strap, a crotch strap, and a securement means; wherein the back strap is secured to the rear portion of the harness body at two securement zones and wherein the crotch strap is secured to the back strap at a position on the back strap between the two securement zones.

7. The portable restraining passenger safety harness of claim 6, wherein the securement means is a five point buckle and wherein the pair of shoulder straps and crotch strap are securable to the five point buckle.

8. The portable restraining passenger safety harness of claim 7, further comprising a crotch strap adjustment means.

9. The portable restraining passenger safety harness of claim 8, wherein the pair of shoulder strap adjustment means and the crotch strap adjustment means are selected from the group consisting of tilt lock adjusters or push button adjusters.

10. The portable restraining passenger safety harness of claim 6, wherein the left shoulder strap of the pair of shoulder straps is secured to the left shoulder strap adjustment means of the pair of shoulder strap adjustment means, wherein the right shoulder strap of the pair of shoulder straps is secured to the right shoulder strap adjustment means of the pair of shoulder strap adjustment means, and wherein the back strap is secured to both the left and right shoulder strap adjustment means.

11. The portable restraining passenger safety harness of claim 1, wherein the harness body includes an inner surface and an outer surface.

12. The portable restraining passenger safety harness of claim 11, wherein the inner surface is made from a material selected from the group consisting of 3D mesh fabric; and wherein the outer surface is made from a material selected from the group consisting of 100 percent ballistic nylon, polyester, cotton, or blends thereof.

13. The portable restraining passenger safety harness of claim 12, further comprising a hook and loop fastener wherein the hook fastener is located on the outer surface and the loop fastener is located on the inner surface.

14. The portable restraining passenger safety harness of claim 3, further comprising a back panel located on the rear portion of the harness body, and wherein the back panel is sized so that a seat belt of a vehicle can pass therethrough.

15. The portable restraining passenger safety harness of claim 14, wherein the back panel encases a portion of both the left and right shoulder straps of the pair of shoulder straps.

16. The portable restraining passenger safety harness of claim 3, further comprising a pair of anchor point attachment means secured in positions on the rear portion of the harness body.

17. The portable restraining passenger safety harness of claim 16, wherein the pair of anchor point attachment means are utilized to secure a top tether attachment device to the safety harness to secure the safety harness to a top tether anchorage of a vehicle.

18. The portable restraining passenger safety harness of claim 3, further comprising a first strap guide and a second strap guide, wherein both the first and second strap guides are secured to the front portion of the harness body such that the left shoulder strap of the pair of shoulder straps travels under the first strap guide and the right shoulder strap of the pair of shoulder straps travels under the second strap guide.

19. The portable restraining passenger safety harness of claim 3, wherein both the left and right shoulder straps of the pair of shoulder straps are each secured to the rear portion of the harness body at three different securement zones.

* * * * *